Sept. 15, 1970     A. J. TRAHAN     3,528,796

MOLD LOCKING MECHANISM FOR GLASSWARE FORMING MACHINE

Filed Nov. 24, 1967     2 Sheets-Sheet 1

INVENTOR.
ALBERT J. TRAHAN
BY
McCormick, Paulding & Huber
ATTORNEYS

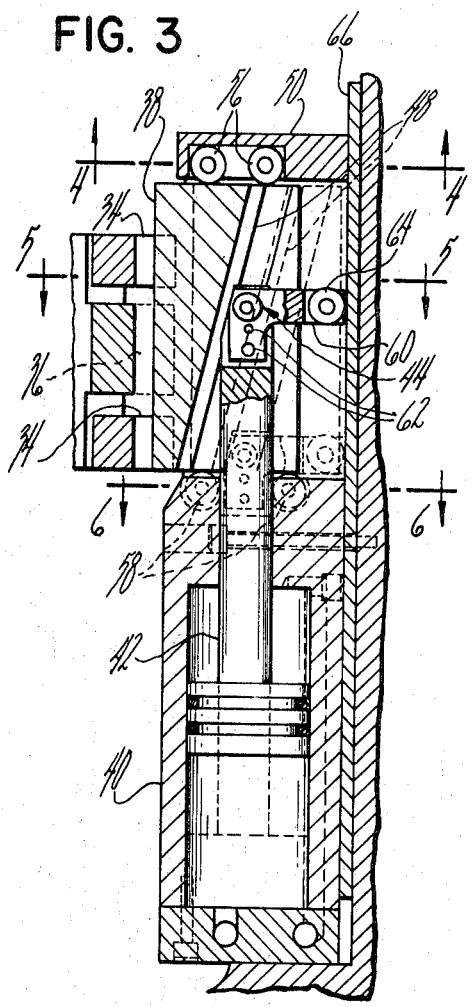

United States Patent Office 3,528,796
Patented Sept. 15, 1970

3,528,796
MOLD LOCKING MECHANISM FOR GLASSWARE FORMING MACHINE
Albert J. Trahan, Vernon, Conn., assignor to Emhart Corporation, Bloomfield, Conn., a corporation of Connecticut
Filed Nov. 24, 1967, Ser. No. 685,443
Int. Cl. C03b 9/00
U.S. Cl. 65—357                                         10 Claims

ABSTRACT OF THE DISCLOSURE

A pair of mold holder arms are pivotally mounted on a common hinge pin and are movable toward and away from one another in unison through a pair of toggle links connected to the arms. The arms carry inserts which in turn carry the mold sections. An extension of each arm has a free end portion with a projecting lug which overlaps the lug on the other arm extension to provide a wedge opening therebetween. A wedge member is movable toward the hinge pin and between the lugs to urge the lugs apart and hence force the mold sections together. A reciprocable air motor has an extensible part which carries a roller, and the roller rides in an inclined slot in the wedge member so that the wedge can be moved in the plane defined by the mold holder arm movement in response to movement of the extendable motor part in a direction perpendicular to this plane.

SUMMARY OF INVENTION

This invention relates to mechanisms for locking partible mold sections of a glassware forming machine, and deals more particularly with a mold locking mechanism which is air operated in timed relationship with closing movement of the mold holder arms for wedging the mold holder arms to effect locking of the mold sections against internal pressures generated as a result of expansion of the glass therein due to pressing or blowing.

The general object of the present invention is to provide a mold locking mechanism of the foregoing character wherein a wedge, movable in a plane defined by the movable mold holder arms, engages projecting portions of these arms to wedge the arms toward one another and lock the mold sections against one another without destroying the capability of the mold holder inserts and hence the mold sections themselves to pivot with respect to one another during closing movement of the mold holder arms as they align with one another to form the mold cavity or cavities.

BRIEF DESCRIPTION OF THE DRAWINGS

FIG. 3 is a vertical sectional view taken along the line 3—3 of FIG. 1.

FIG. 4 is a horizontal sectional view taken along the line 4—4 of FIG. 3.

FIG. 5 is a horizontal sectional view taken along the line 5—5 of FIG. 3.

FIG. 6 is a horizontal sectional view taken along the line 6—6 of FIG. 3.

FIG. 8 is a plan view of the free end portions of each of the mold holder arms together with the wedge being drawn to a somewhat larger scale than that of FIG. 1.

DETAILED DESCRIPTION

Figure 1:
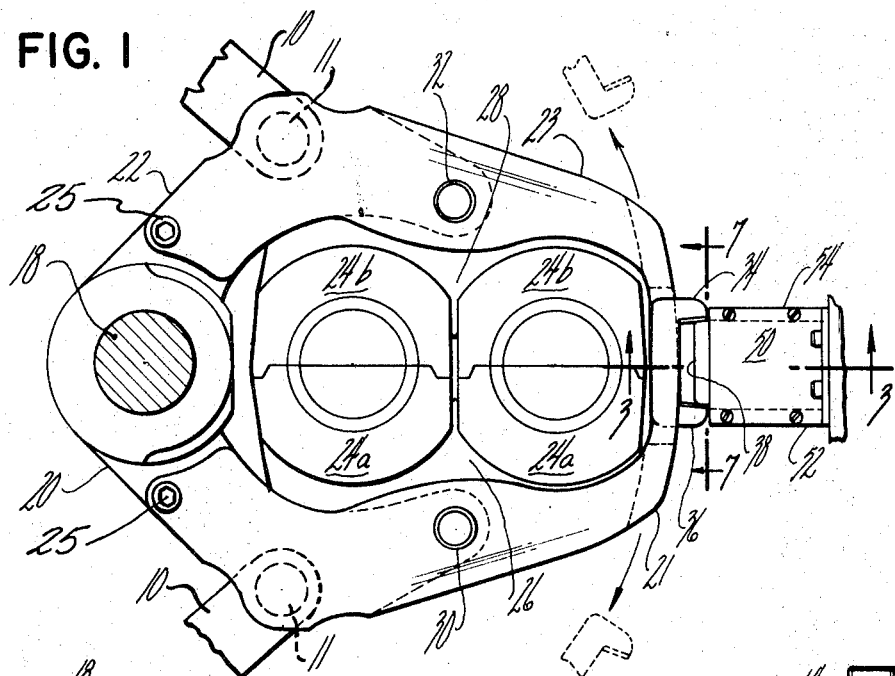
FIG. 1 is a plan view showing the mold holder arms and mold sections in the closed position with the wedge of the present invention in position for locking the arms, the arms extensions being shown in broken lines to illustrate the open position thereof.

The construction shown in the drawings is especially well suited for use in a glassware forming machine of the so-called Hartford I.S. type shown and described in the patent to Ingle, No. 1,911,119, wherein a blank, or parison mold, is provided at one side of the machine for initially forming the glass gob, and wherein the parison is subsequently rotated in a vertical plane to the upright condition for finished forming in a so-called blow mold. As shown in the drawings, a blow mold is provided for forming simultaneously two glass containers at the blow mold side of one section of such a machine.

As described in Ingle the mold halves, or sections, are pivoted inwardly on mold holder arms in response to simultaneous movement of a pair of toggle links 10, 10. The mechanism for moving the parison from the blank mold side of the machine to the blow mold side shown is indicated generally at 12 and comprises the so-called neck ring mechanism which includes a vertically disposed rack gear 14 for meshing with a spur gear 16 upon which the neck ring is mounted for movement in a vertical plane from the blank mold side to the blow mold side shown.

Figure 2:
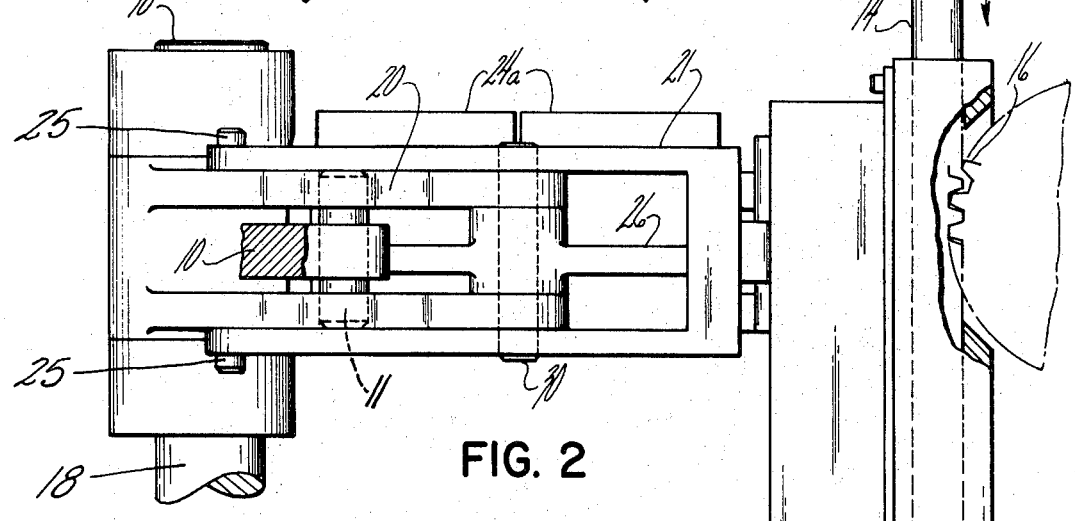
FIG. 2 is a side elevational view of the apparatus shown in FIG. 1 with a portion of the neck ring mechanism of the glassware forming machine added thereto.

While the mechanism to be described will be seen to be particularly well suited for use in a glassware forming machine of the type shown and described in Ingle, it will be apparent from the description to follow that the essential features of the present invention could be adapted for use with any multi-part mold section used to receive glass articles for forming. Referring more particularly to FIG. 1, the blow mold hinge pin 18 extends vertically upwardly from the fixed frame of the machine and pivotally supports mold holder arms 20 and 22 in a conventional manner. The mold holder arms 20 and 22 are movable to and from the closed position shown by conventional toggle links 10, 10 as described in the Ingle patent. In the embodiments shown, two glassware articles are formed in the mold sections 24a and 24b, which are mounted to the mold holder arms 20 and 22 respectively for movement therewith in a conventional manner. More particularly, the mold section 24b associated with the mold holder arm 22 is carried by an insert 28, and the mold section 24a is carried by an insert 26 mounted to the mold holder arm 20. As shown in FIG. 2, the mold holder insert 26 is pivotally carried by the end portion of the mold holder arm 20 on a pin 30, which pin provides a fulcrum for assuring that the mold sections 24a and 24b align themselves with one another in the process of closing against one another. The mold section 24b is similarly carried in insert 28, which insert is connected, by means of a pin 32, to the end portion of the mold holder arm 22.

Figure 7:
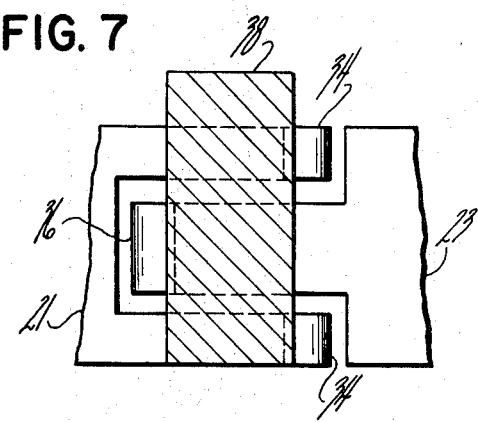
FIG. 7 is a vertical sectional view taken along the line 7—7 of FIG. 1.

The foregoing description of the apparatus shown in FIGS. 1 and 2 comprises a conventional double gob glassware forming machine section. In accordance with the present invention, mechanism is provided for locking the partible mold sections in engagement with one another after the mold sections have been closed by the conventional mold closing mechanism. As shown in FIGS. 1 and 2, the mold holder arm 20 is provided with a U-shaped mold holder arm extension 21, which extension has upper and lower legs pinned to the insert pin 30. The ends of these upper and lower legs are attached to the mold holder arms by screws 25, 25. The base portion of the U-shaped extension 21, extends outwardly and around the mold section 24a and terminates in a lug 34 which overlaps a corresponding mold holder arm extension associated with the arm 22. The extension 23 is similar in construction to the U-shaped extension 21, being pinned to the mold holder arm 22 by the insert pivot pin 32 and having its ends attached to the arm by the screws 25, 25. Thus, the extension 23 extends outwardly and around the mold section 24b and defines a lug portion 36. As best shown in FIG. 7, the lug defining portion 34 of the extension 21 comprises a yoke-like structure adapted to permit the lug defining portion 36 of the other extension 23 to fit therebetween in overlapping relation. As so constructed the facing surfaces of the lug defining portions 34 and 36 define camming surfaces against which a wedge member 38 having opposed side surfaces can be moved. The wedge member 36 is so shaped as to cooperate with the spaced camming surfaces on the lugs 34 and 36. Thus, the lug defining portions 34 and 36 on the mold holder arm extensions 21 and 23 define a socket for receiving the wedge member 38, which wedge member tends to spread the lug defining portions 34 and 36 thereof and thereby lock the mold sections against one another. It should be noted that the mold holder arm extensions might be fabricated integrally with the arms themselves without departing from the scope of the present invention and the term extension as used in the appended claims is intended to include such an embodiment.

In further accordance with the present invention means is provided for moving the wedge member into and out of engagement with the camming surfaces defined on the lugs 34 and 36. As best shown in FIG. 3 said means includes a reciprocable air actuator having a fixed part 40 mounted in the machine frame, and an extensible part 42 adapted to move between the solid and broken line positions shown. The extensible part 42 includes a piston slidably received in the fixed part 40 and an actuating shaft extending upwardly through a bore in the fixed part 40 and carrying a roller 44 at its upper end. As best shown in FIG. 5, the roller 44 actually comprises two rollers mounted on opposite ends of a short stub shaft 46, which shaft 46 is supported in the upper end of the actuating rod, and more particularly between the bifurcations defined in the upper end portion thereof. The wedge member 38 is mounted for translational movement in a horizontal plane generally toward and away from the hinge pin 18 in response to vertical movement of the extensible part 42 of the air motor. Thus, the extensible part 42 of the air motor moves generally parallel the hinge pin along a vertical line, suitable means being provided for connecting the extensible part to the wedge member so as to impart movement of the latter generally toward the hinge pin in response to extension of the part 42.

The wedge member 38 can be seen from FIG. 3 to protrude from a generally rectangularly shaped cavity in the fixed frame of the machine defined by an upper plate 50 and side plates 52 and 54. Top and bottom sets of rollers, 56 and 58 respectively, are provided in the plate 50 and the fixed part 40 of the air motor for engaging the top and bottom surfaces, respectively, of the generally rectangularly shaped wedge. The upper set of rollers 56, 56 is shown to best advantage in FIG. 4 and the lower set of rollers 58, 58 is shown in FIG. 6.

The wedge member 38 also defines a pair of inclined cam slots 48, 48 for receiving the rollers 44, 44 mounted at the upper end of the extensible part 42 of the air motor. Thus, as the actuating rod of the air motor moves upwardly in response to air under pressure provided at the lower side of the piston, the rollers 44, 44 cause movement of the wedge member 38 toward the left in FIG. 3 so as to engage the camming surfaces defined on the lug portions, 34 and 36, of the mold holder arm extensions 21 and 23 respectively.

The upper end of the piston rod 42 carries an angle bracket between the bifurcated upper end portions thereof as best shown in FIG. 5 at 60.

The bracket 60 has a depending leg which is attached to the piston rod 42 as best shown in FIG. 3 by rivets 62, 62 and a right angle leg extends to the right in FIG. 3 and carries a roller 64 for engaging a fixed vertical surface in the machine frame defined by the plate 66. Thus the wedge translates between the roller sets 56 and 58, and is engaged by a third set of rollers 44, 44 on the actuating rod. Finally, the roller 64 serves to prevent binding of the actuating rod as a result of the forces reacted by the wedge member 38 during operation of the mold locking mechanism.

The invention claimed is:

1. Mechanism for locking partible mold sections in engagement with one another in a glassware forming machine having movable mold holder arms for supporting the mold sections, said mechanism comprising extensions projecting from said mold holder arms in the direction of mold closing movement and overlapping one another to define spaced lugs having internal facing camming surfaces thereon when said mold sections are closed, a wedge member having opposed side surfaces for engaging said spaced internal facing camming surfaces on said lugs, and means for moving said wedge member into and out of engagement with said lugs.

2. The combination defined in claim 1 wherein said means for moving said wedge comprises a reciprocable fluid motor with a fixed part mounted in the machine frame and an extensible part connected to said wedge member.

3. The combination defined in claim 2 wherein said mold holder arms are pivotally mounted on an upright hinge pin fixed in the machine frame for movement in a horizontal plane, said lugs being provided at the free end portions of said mold holder arm extensions and said free end portions overlapping one another in the closed position of said arms to define camming surfaces on said lugs which face one another so that said wedge member tends to spread said lugs and clamp said mold sections together.

4. The combination defined in claim 3 wherein said extensible fluid motor part moves generally parallel said hinge pin, and means connecting said wedge member to the outer end of said extensible fluid motor part to impart movement of said wedge member toward said hinge pin in response to extension of said extensible fluid motor part.

5. The combination defined in claim 4 wherein said means connecting the outer end of said extensible fluid motor part to said wedge member comprises means in the machine frame above and below said member for supporting it for limited translational movement in a horizontal plane toward and away from said hinge pin into and out of lateral engagement with said lugs respectively, and roller means on the outer end of said extensible fluid motor part, said roller means being located in at least one inclined slot in said wedge member.

6. The combination defined in claim 5 and further characterized by a bracket carried by the outer end of said extensible motor part and including an arm thereon which extends away from said lug engaging portion of said wedge member, and at least one roller on said arm for engaging a fixed vertically extending surface in said fixed machine frame to react the force exerted on said wedge member by said lugs.

7. The combination defined in claim 6 wherein said wedge member has inclined lug engaging side surfaces for engaging cooperatively shaped camming surfaces on said lugs, and said wedge supporting means comprising rollers mounted in the fixed machine frame.

8. The combination defined in claim 3 further characterized by mold holder insert means carried by said mold holder arms for supporting a plurality of such partible mold sections, said insert means including pivot pins for pivotally mounting each of said insert means on said mold holder arms respectively.

9. The combination defined in claim 8 wherein said mold holder arm extensions comprise U-shaped members having leg portions attached to said mold holder arms.

10. The combination defined in claim 9 wherein said pivot pins serve to attach said mold holder arm extension members to said mold holder arms respectively.

References Cited

UNITED STATES PATENTS

| | | | |
|---|---|---|---|
| 879,294 | 2/1908 | Miller | 65—357 |
| 1,398,670 | 11/1921 | Bridges | 65—357 |
| 2,252,391 | 8/1941 | Benoit et al. | |
| 2,304,736 | 12/1942 | Louden et al. | |
| 2,383,556 | 8/1945 | Louden et al. | |
| 2,942,382 | 6/1960 | Hamilton | 65—360 |
| 3,149,951 | 9/1964 | Mennitt et al. | 65—359 XR |

FRANK W. MIGA, Primary Examiner

U.S. Cl. X.R.

65—359, 360, 361